United States Patent
Okita et al.

(10) Patent No.: US 11,315,297 B2
(45) Date of Patent: Apr. 26, 2022

(54) ELECTRONIC KEY PHOTO ALBUM, PROGRAM FOR CREATING ELECTRONIC KEY PHOTO ALBUM, AND METHOD FOR CREATING ELECTRONIC KEY PHOTO ALBUM

(71) Applicant: GRAPHSYSTEM CO., LTD., Kure (JP)

(72) Inventors: Yoshihiro Okita, Kure (JP); Shiro Hoan, Kure (JP)

(73) Assignee: GRAPHSYSTEM CO., LTD., Hiroshima (JP)

( * ) Notice: Subject to any disclaimer, the term of this patent is extended or adjusted under 35 U.S.C. 154(b) by 0 days.

(21) Appl. No.: 17/043,796

(22) PCT Filed: Sep. 20, 2019

(86) PCT No.: PCT/JP2019/037087
§ 371 (c)(1),
(2) Date: Sep. 30, 2020

(87) PCT Pub. No.: WO2020/059870
PCT Pub. Date: Mar. 26, 2020

(65) Prior Publication Data
US 2021/0248796 A1    Aug. 12, 2021

(30) Foreign Application Priority Data

Sep. 20, 2018  (JP) .............................. JP2018-176650

(51) Int. Cl.
*G06T 11/60* (2006.01)
*G06T 7/11* (2017.01)
(Continued)

(52) U.S. Cl.
CPC ............ *G06T 11/60* (2013.01); *G06F 16/535* (2019.01); *G06T 7/11* (2017.01); *H04N 5/9201* (2013.01)

(58) Field of Classification Search
CPC .......... G06T 11/60; G06T 7/11; G06F 16/535; H04N 5/9201
(Continued)

(56) References Cited

U.S. PATENT DOCUMENTS

| | | | |
|---|---|---|---|
| 2004/0169664 A1* | 9/2004 | Hoffman | G06T 11/20 345/629 |
| 2008/0218812 A1* | 9/2008 | Wolf | H04N 1/00331 358/474 |

(Continued)

FOREIGN PATENT DOCUMENTS

| | | |
|---|---|---|
| JP | 6008376 | 9/2016 |
| WO | 2018/003953 A1 | 1/2018 |

OTHER PUBLICATIONS

Card Wallet Pro that you can carry your own membership card etc. in your smartphone: https://japan.cnet.com/article/35067005/.
(Continued)

*Primary Examiner* — Michael R Neff
(74) *Attorney, Agent, or Firm* — Womble Bond Dickinson (US) LLP; Joseph Bach, Esq.

(57) ABSTRACT

To securely create an electronic album of photos taken of various keys owned by a person regardless of types of the keys, the electronic key photo album (10) includes a dummy photo generator (11) that cuts out a key image from a photo of a key taken together with a background of the key and complements the photo with a dummy image to generate a dummy photo; a photo storage controller (12) that stores the dummy photo in a first storage (101) together with metadata of the photo of the key and stores the key image in a second storage (102) in association with the dummy photo together (Continued)

with a relative position of the key image in the photo of the key; a photo restorer (13) that reads out a dummy photo from the first storage, reads out, from the second storage, a key image associated with the dummy photo thus read out and a relative position of the key image thus read out, and pastes the key image thus read out to the relative position thus read out in the dummy photo thus read out to restore an original photo of a key in the key image thus read out, and a photo forwarder (14) that transfers the original photo of the key to a display device.

12 Claims, 4 Drawing Sheets

(51) Int. Cl.
*G06F 16/535* (2019.01)
*H04N 5/92* (2006.01)

(58) Field of Classification Search
USPC .......................................................... 345/634
See application file for complete search history.

(56) References Cited

U.S. PATENT DOCUMENTS

2014/0229822 A1* 8/2014 Prebble .................. G06T 11/60
 715/252
2016/0364615 A1* 12/2016 Sakoda .............. H04N 1/00244

OTHER PUBLICATIONS

NYC Startup KeyMe Releases an App That Promises You'll Never Get Locked Out Again http://techcrunch.com/2013/08/08/nyc-startup-keyme-releases-an-app-that-promises-youll-never-get-locked-out-again/.
International Search Report and Written Opinion (PCT/JP2019/037087).

* cited by examiner

ELECTRONIC KEY PHOTO ALBUM, PROGRAM FOR CREATING ELECTRONIC KEY PHOTO ALBUM, AND METHOD FOR CREATING ELECTRONIC KEY PHOTO ALBUM

RELATED APPLICATIONS

The present application is the national phase of International Application No. PCT/JP2019/037087, filed on Sep. 20, 2019, which claims priority to and the benefit of Japanese Patent Application No. 2018-176650, filed on Sep. 20, 2018, and these applications are hereby incorporated herein by reference in their entireties.

TECHNICAL FIELD

The present invention relates to a technique for creating an electronic album of photos taken of various types of keys owned by a person.

BACKGROUND ART

There are various types of keys around us, such as entrance keys, room keys, safe keys, warehouse keys, car keys, garage keys, and motorcycle keys. When the number of keys that a person has increases, he/she may no longer be able to distinguish the keys from each other. Thus, the keys have to be appropriately organized.

Keys are typically organized by being provided with key tags. Alternatively, cloud-based key management is recently available. The cloud-based key management works in such a manner that an image obtained by scanning a key is saved in the cloud in advance, and based on the image, the key is duplicated as necessary.

SUMMARY OF INVENTION

Technical Problem

When keys are organized with the help of key tags, writing necessary information on the key tags is laborsome. Moreover, when the number of keys provided with key tags increases, the key tags are bulky and cumbersome.

In contrast, in the cloud-based key management, simply capturing images of keys enables the keys to be easily organized. However, it may be difficult for a person to tell, by simply viewing a photo of the key, what key it is. Moreover, in case of leakage of the photo of the key, another person may duplicate the key. Further, if the photo of the key includes metadata such as a shooting location, a place of use of the key may be identified. Furthermore, since the object of the cloud-based key management is duplication of keys, the cloud-based key management is directed to mechanical keys but is not directed to electronic keys such as remote controller keys and card keys.

In view of the foregoing, it is an object of the present invention to securely create an electronic album of photos taken of various keys owned by a person regardless of types of the keys.

Solution to Problem

One aspect of the present invention provides an electronic key photo album including a dummy photo generator that cuts out, from a photo of a key taken together with a background of the key, a key image which is a partial image including the key and complements, with a dummy image, an area from where the key image is cut out to generate a dummy photo; a photo storage controller that store the dummy photo in a first storage together with metadata such as a shooting location and shooting date and time of the photo of the key and stores the key image in a second storage in association with the dummy photo together with a relative position of the key image in the photo of the key; a photo restorer that reads out, from the first storage, a dummy photo, reads out, from the second storage, a key image associated with the dummy photo thus read out and a relative position of the key image thus read out, and pastes the key image thus read out to the relative position thus read out in the dummy photo thus read out to restore an original photo of a key in the key image thus read out; and a photo forwarder that forwards the original photo of the key to a display device.

The photo restorer may receive a search condition such as a shooting location and shooting date and time from a user, find a dummy photo having metadata that meets the search condition in the first storage, and read out the dummy photo from the first storage.

The dummy photo generator may process the key image to generate the dummy image.

The key may include at least one of a mechanical key, a remote controller key, or a card key.

Another aspect of the present invention provides a non-transitory computer-readable storage medium on which a program for creating an electronic key photo album is stored, wherein the program is a computer program for creating the electronic key photo album on the computer.

Still another aspect of the present invention provides a method for creating an electronic key photo album, wherein the method is compatible with the electronic key photo album.

Advantageous Effects of Invention

The present invention enables an electronic album of photos taken of various keys owned by a person to be securely created regardless of types of the keys.

DESCRIPTION OF EMBODIMENTS

An embodiment will be described in detail below with reference to the drawings. Note that unnecessarily detailed description may be omitted. For example, the detailed description of matters already well known and/or the duplicated description of substantially the same components may be omitted. This is to avoid making the following description unnecessarily redundant and to facilitate the understanding by those skilled in the art.

Note that the inventor provides the drawings and the following description so that those skilled in the art satisfactorily understand the invention, but the drawings and the following description do not limit the subject matter of the claims.

According to an electronic key photo album, a program for creating the electronic key photo album, and a method for creating the electronic key photo album of the present invention, photos taken of various kinds of keys owned by a person are stored and organized, that is, an electronic album of the photos is created, and the photo of one of the keys thus stored and organized is, in response to a request by a user, presented to the user. As used herein, the "key" handled by the present invention is not limited to a key (mechanical key) to a mechanical lock represented by a cylinder lock but may include an electronic key such as a remote controller key and a card key. That is, in the electronic key photo album, the program for creating the electronic key photo album, and the method for creating the electronic key photo album according to the present invention, the types, shapes, and sizes of the keys are not limited.

Configuration

Figure 1:
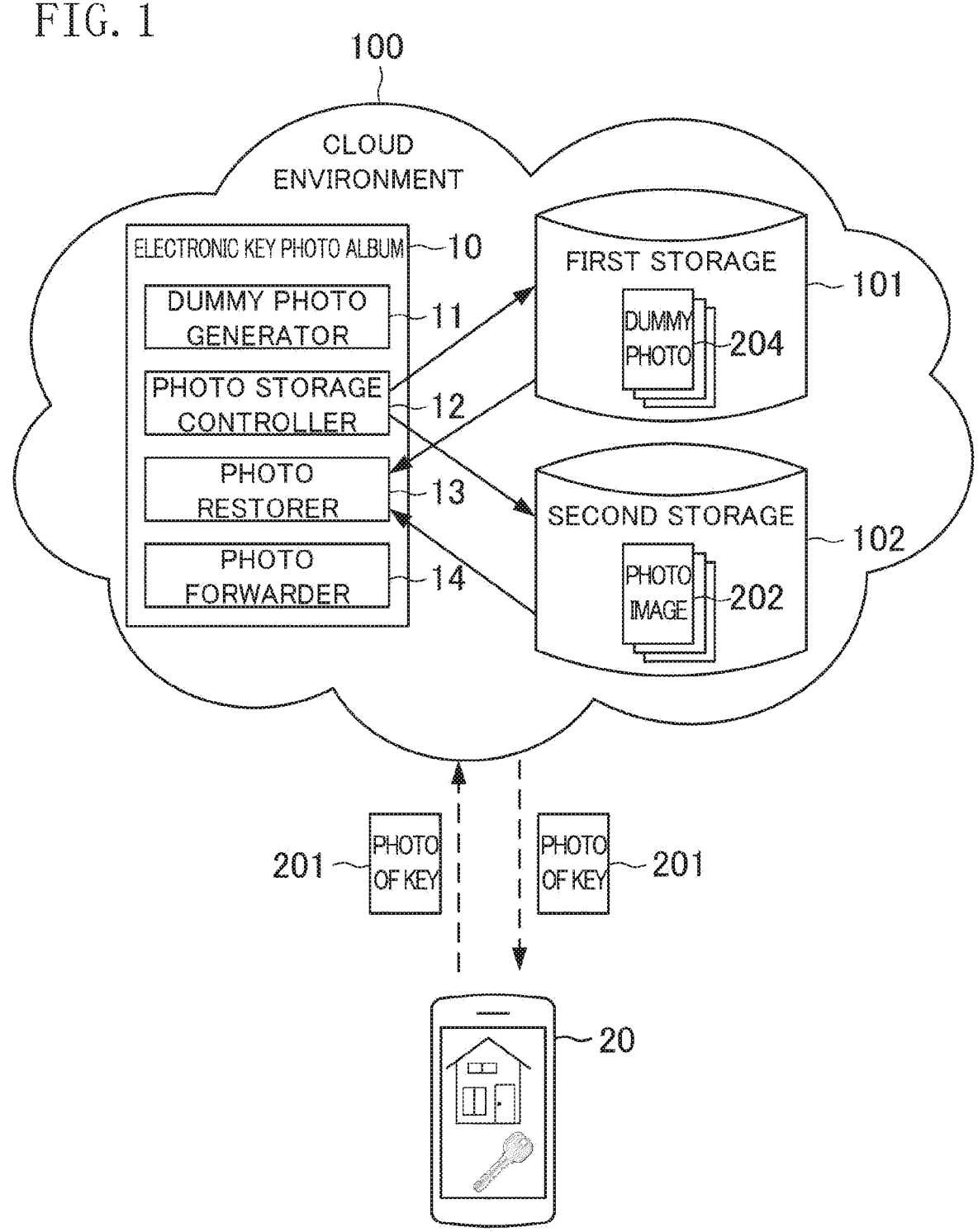
FIG. 1 is a block diagram illustrating an electronic key photo album according to an embodiment of the present invention.
Figure 2:
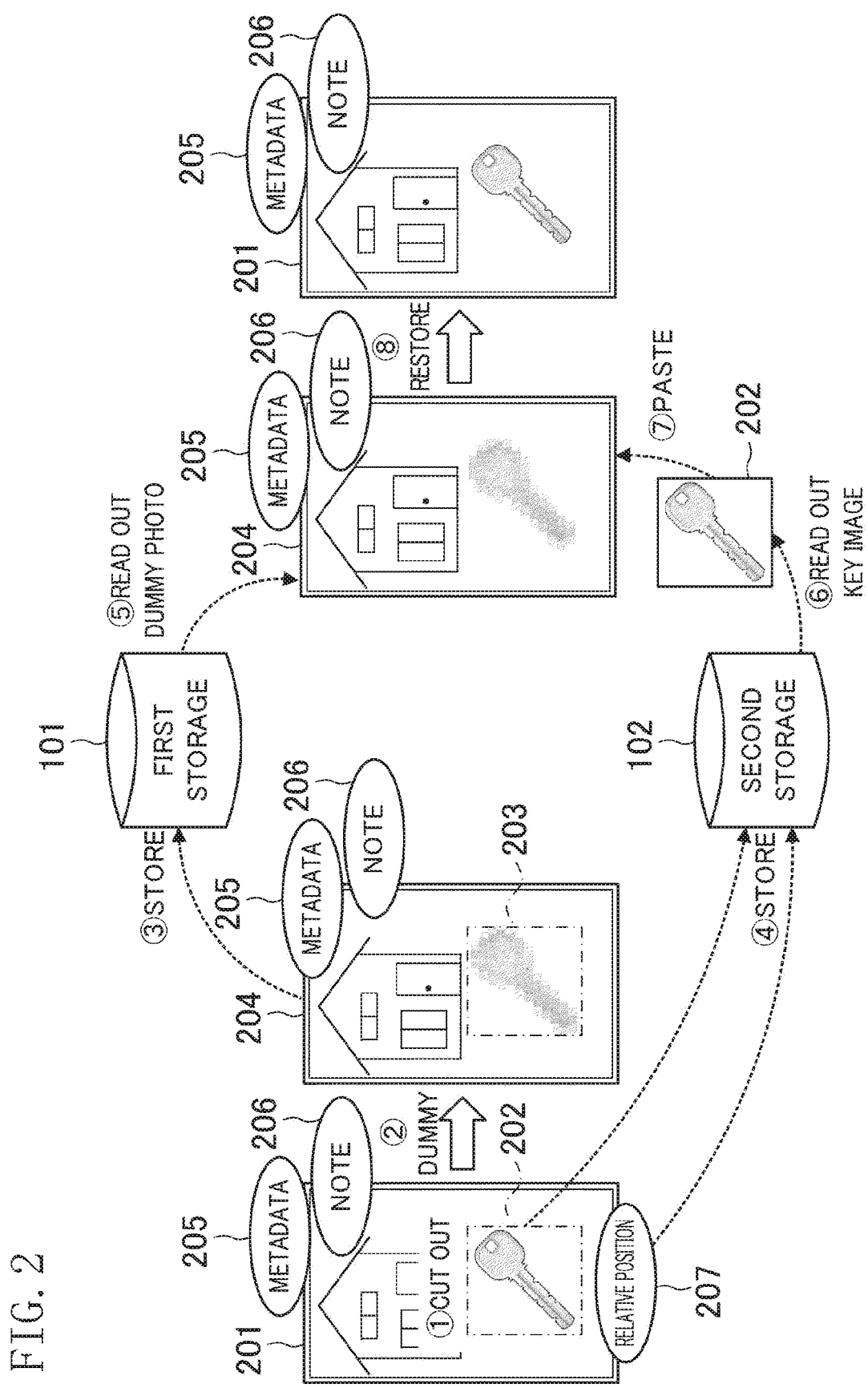
FIG. 2 is a diagram schematically illustrating transformation of a photo of a key in the electronic key photo album.

FIG. 1 is a block diagram illustrating an electronic key photo album 10 according to an embodiment of the present invention. FIG. 2 is a diagram schematically illustrating transformation of a photo of a key in the electronic key photo album 10. The electronic key photo album 10 is configured to be disposed in a cloud environment 100 to provide a service in the form of Software as a Service (SaaS). A user of the service takes photos 201 of various kinds of his/her keys with a user terminal 20 such as a smartphone or a tablet terminal and uploads the photos of the keys to the cloud environment 100. The photos 201 of the keys to be uploaded may be provided with notes. The user may describe the keys in the photos 201 of the keys by providing hand-written notes or notes typed at a software keyboard via an input interface of the user terminal 20 or by providing voice notes to the photos 201 of the keys. The electronic key photo album 10 stores and organizes the photos 201 of the keys uploaded to the cloud environment 100. The user searches the photos of the keys stored and organized in the electronic key photo album 10 for a desired photo and calls and views the desired photo on the user terminal 20. In the case of the photos 201 of the keys provided with the notes, the user may view or listen to the hand-written notes or voice notes provided to the photos 201 of the keys with the user terminal 20.

Specifically, the electronic key photo album 10 includes a dummy photo generator 11, a photo storage controller 12, a photo restorer 13, and a photo forwarder 14. Some or all of these elements included in the electronic key photo album 10 may be realized by causing a server device (not shown) in the cloud environment 100 to execute a dedicated computer program (program for creating the electronic key photo album). Moreover, some or all of these elements included in the electronic key photo album 10 may be realized by hardware such as an Application Specific Integrated Circuit (ASIC) or a Field Programmable Gate Array (FPGA).

The dummy photo generator 11 receives the photo 201 of each key uploaded from the user terminal 20, cuts out a key image 202 which is a partial image including the key from the photo 201 of the key, and complements, with a dummy image 203, an area from where the key image 202 is cut out to generate a dummy photo 204. That is, a real key is not included in the dummy photo 204. Note that, for example, in the case of a door key, a photo the door key is taken together with the door, and in the case of a car key or a motorcycle key, a photo of the key is taken together with the car or the motorcycle, that is, a photo of a key is supposed to be taken together with its background. In doing so, a user, when viewing the photo of the key later, can recognize what key it is, where it is used, and the like.

The area, from which the key image 202 is to be cut out, may be automatically selected by the dummy photo generator 11 by performing image analysis on the photo 201 of the key to recognize the key or may be manually selected by a user by tracing the photo 201 of the key displayed on a screen of the user terminal 20 with his/her finger. Moreover, the shape of the area, from which the key image 202 is to be cut out, is typically rectangular but may be any shape when the area is traced with a finger by so-called Lasso selection.

The dummy image 203 may be an illustration of a key or another item prepared in advance or may be created by subjecting the key image 202 thus cut out to a mosaic process, an airbrushing process, or the like performed by the dummy photo generator 11. Note that when an illustration is used, the size of the illustration has to be adjusted to the area, from which the key image 202 is cut out.

The photo storage controller 12 stores the dummy photo 204 generated by the dummy photo generator 11 in a first storage 101 of the cloud environment 100. Here, a digital photo includes metadata (Exif information) such as a shooting date and time, resolution, ISO sensitivity, and the like. In particular, the user terminal 20 has a Global Positioning System (GPS) function, and a photo taken with the user terminal 20 includes GPS information (latitude, longitude, altitude), as metadata, of the shooting location of the photo. The photo storage controller 12 also stores, in the first storage 101, metadata 205 such as the shooting location and the shooting date and time included in the photo 201 of the key uploaded from the user terminal 20. Note that in the case where the photo 201 of the key is provided with a note 206, the photo storage controller 12 also stores the note 206 in the first storage 101. Moreover, the photo storage controller 12 stores, in a second storage 102 in the cloud environment 100, the key image 202 in association with the dummy photo 204 stored in the first storage 101 together with a relative position 207 of the key image 202 in the photo 201 of the key. For example, when the image shape of the key image 202 is rectangular, the offset location of the upper left point of the key image 202 from the upper left point, defined as an original point, of the photo 201 of the key in the coordinate system may be adopted as the relative position 207. When the key image 202 has an image shape other than the rectangular shape, a minimum rectangular area which can include the key image 202 is set, and the offset location of the upper left point of the minimum rectangular area in the coordinate system may be adopted as the relative position 207.

The first storage 101 and the second storage 102 may use a storage independent of the electronic key photo album 10, for example, a storage disposed at a data center. Moreover, the first storage 101 and the second storage 102 preferably use different data centers. This reduces, to a very low level, the risk of simultaneous leakage of the dummy photo 204 stored in the first storage 101 and the key image 202 stored in the second storage 102.

The photo restorer 13 reads out a dummy photo 204 from the first storage 101, reads out, from the second storage 102, a key image 202 associated with the dummy photo 204 thus read out and a relative position 207 of the key image 202 thus read out, and pastes the key image 202 thus read out to the relative position 207 thus read out in the dummy photo 204 thus read out to restore an original photo 201 of a key in the key image 202 thus read out.

A user may specify a search condition such as the shooting date and time and the shooting location of the photo of a key via a Graphical User Interface (GUI) displayed on the screen of the user terminal 20 to search for the photo of the key stored in the electronic key photo album 10. In this case, the photo restorer 13 receives the search condition from the user terminal 20, finds a dummy photo 204 having metadata that meets the search condition in the first storage 101, and reads out the dummy photo 204 from the first storage 101 to restore an original photo 201 of the key.

The photo forwarder 14 transfers the original photo 201 of the key thus restored by the photo restorer 13 to the user terminal 20. The photo 201 of the key transferred to the user terminal 20 is displayed on the screen of the user terminal 20 and can be viewed by the user. Moreover, in the case where the original photo 201 of the key is provided with the note 206, the user can view or listen to the (voice) note 206 with the user terminal 20.

Operation

Figure 3:
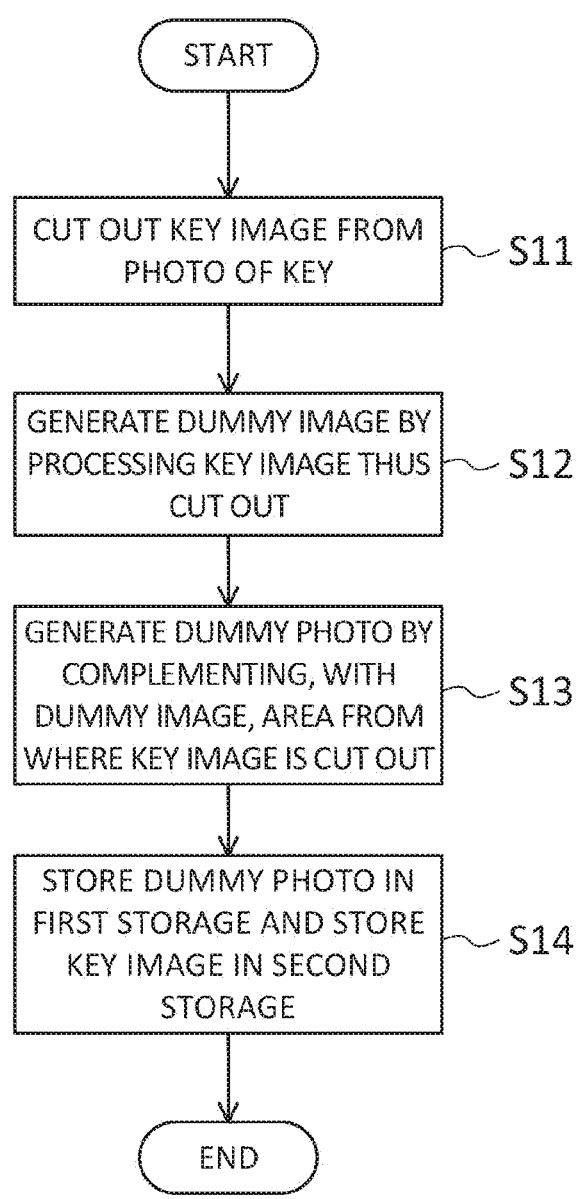
FIG. 3 is a flowchart illustrating a process of creating an electronic album of photos of keys.

Operation of the electronic key photo album 10 will be described. First of all, a process of creating an electronic album of photos of keys by the electronic key photo album 10 will be described. FIG. 3 is a flowchart illustrating a process of creating the electronic album of the photos of the keys. First of all, the dummy photo generator 11 cuts out the key image 202 from the photo 201 of each key uploaded from the user terminal 20 (S11). When the key image 202 is cut out, the dummy photo generator 11 processes the key image 202 to generate the dummy image 203 (S12). When the dummy image 203 is generated, the dummy photo generator 11 complements an area, from which the key image 202 is cut out, with the dummy image 203 to generate the dummy photo 204 (S13). Note that when an illustration prepared in advance is used as the dummy image 203, step S12 may be omitted. When the dummy photo 204 is generated, the photo storage controller 12 stores the dummy photo 204 in the first storage 101 together with the metadata 205 of the photo 201 of the key and stores, in the second storage 102, the key image 202 in association with the dummy photo 204 together with the relative position 207 of the key image 202 in the photo 201 of the key (S14).

As described above, the electronic key photo album 10 does not store the photo 201 of each key uploaded from the user terminal 20 as it is, but the electronic key photo album 10 cuts out, from the photo 201 of the key, the key image 202 which is a partial image including the key, replaces the key image 202 with the dummy image 203 to generate the dummy photo 204, and stores the dummy photo 204 and the key image 202 in different storages (i.e., the first storage 101 and the second storage 102).

Note that a user may delete, from the first storage 101, one or more dummy photos 204 that are no longer necessary. The photo storage controller 12 deletes any dummy photos 204 and metadata 205 stored in the first storage 101 in accordance with a request by the user. In this case, the photo storage controller 12 also deletes, from the second storage 102, the key image 202 and the relative position 207 corresponding to the dummy photos 204.

Figure 4:
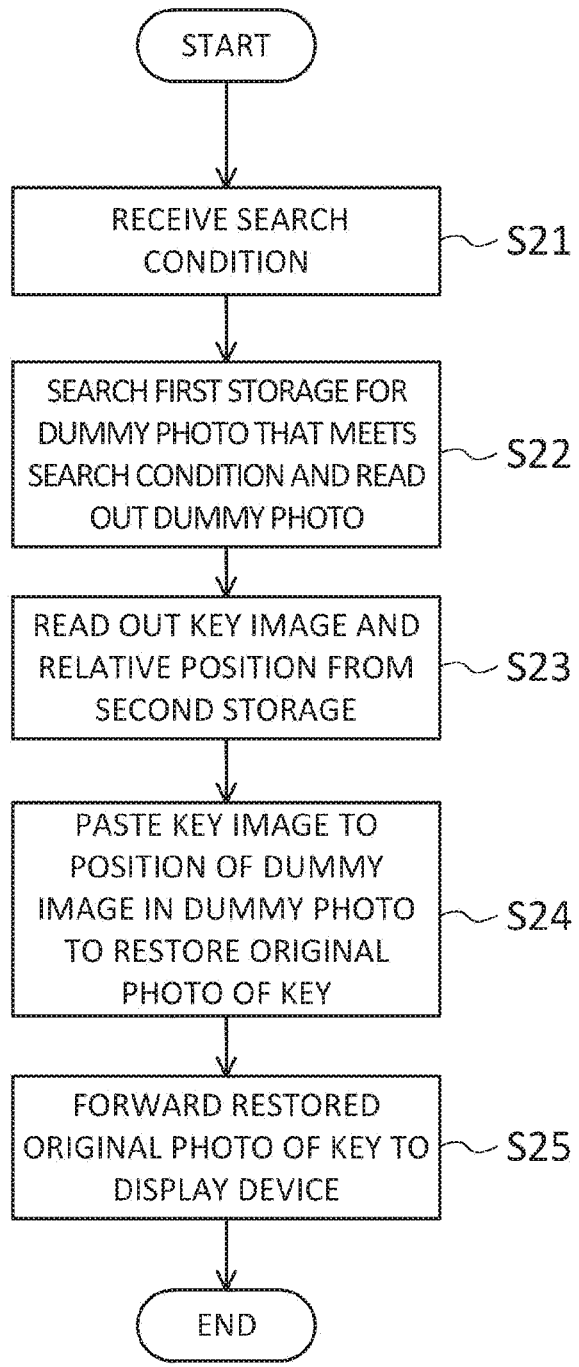
FIG. 4 is a flowchart illustrating a process of presenting a photo of a key in the electronic album.

Next, a presentation process of the photo of a key by the electronic key photo album 10 will be described. FIG. 4 is a flowchart illustrating the presentation process of the photo of the key in the electronic album. First of all, the photo restorer 13 receives a search condition such as shooting date and time and a shooting location of the photo of the key from the user terminal 20 (S21), finds a dummy photo 204 having metadata that meets the search condition in the first storage 101 and reads out the dummy photo 204 from the first storage 101 (S22). Subsequently, the photo restorer 13 reads out, from the second storage 102, a key image 202 associated with the dummy photo 204 thus read out and a relative position 207 of the key image 202 thus read out (S23). Then, the photo restorer 13 pastes the key image 202 thus read out to the relative position 207 thus read out in the dummy photo 204 thus read out to restore an original photo 201 of the key (S24). When the original photo 201 of the key is restored, the photo forwarder 14 forwards the original photo 201 of the key thus restored to the user terminal 20 (S25). Thus, the photo 201 of the key is displayed on the screen of the user terminal 20.

As described above, when a user requests the presentation of the photo 201 of the key, the electronic key photo album 10 reads out the dummy photo 204 from the first storage 101, reads out the key image 202 from the second storage 102, restores the original photo 201 of the key from the photo 201 and the key image 202, and forwards the original photo 201 to the user terminal 20.

Effects

According to the electronic key photo album 10 of the present embodiment, the key image 202 which is a partial image including the key in the photo 201 of the key uploaded from the user terminal 20 is replaced with the dummy image 203, thereby generating the dummy photo 204, that is, the dummy photo 204 and the key image 202 are stored in different storages (i.e., the first storage 101 and the second storage 102). Thus, even if data leaks from the first storage 101 or the second storage 102, only the dummy photo 204 or the key image 202 is divulged to another person, and there is no risk that the photo 201 taken of the key together with its background is exposed to another person.

When a user wishes to view the photo 201 of the key stored in the electronic key photo album 10, the original photo 201 of the key is restored from the dummy photo 204 and the key image 202 and is presented to the user. Therefore, the user can view the photo 201 of the key without considering that the photo 201 is stored as the dummy photo 204 and the key image 202 in a separated manner. That is, according to the electronic key photo album 10 of the present embodiment, the photo 201 of the key is securely organized into the electronic album without degrading the convenience of the user.

Moreover, organizing the photo 201 of the key provided with the note 206 into an electronic album allows information to be added to the photo 201 of the key. The information is unobtainable from the photo 201 of the key and is, for example, information that a place of use of the key in the photo 201 of the key is different from the shooting location of the photo, or information that the key is a key deposited with the user by another person. This improves the convenience of the user.

Variations

In the above description, the electronic key photo album 10 does not have to be disposed in the cloud environment 100 but may be implemented as an application in the user terminal 20 or the other standalone computers. In this case, memory, storage, external memory, external storage, or the like of the user terminal 20 or the other standalone computers may be used as the first storage 101 or the second storage 102, or the first storage 101 and the second storage 102 in the cloud environment 100 may be used. Alternatively, as one of the first storage 101 and the second storage 102, the user terminal 20 or a storage of the other standalone computer may be used, and as the other of the first storage 101 and the second storage 102, a storage disposed in the cloud environment 100 may be used.

As can be seen from the foregoing, the embodiment has been described as a mere example of the technique in the present invention. For this purpose, the drawings and the detailed description are provided.

Thus, the components illustrated in the drawings and the detailed description may include not only components essential for solving the problems but also components which are mentioned to illustrate the technique but which are not essential for solving the problems. Therefore, these components which are not essential should not be construed as essential only because they are illustrated in the drawings and the description.

Moreover, the embodiment is to illustrate the technique of the present invention, and thus, modification, replacement, addition, omission, and the like may be made in various ways within the scope of the claims or equivalent scopes thereof.

REFERENCE SIGNS LIST

10 . . . ELECTRONIC KEY PHOTO ALBUM, 11 . . . DUMMY PHOTO GENERATOR, 12 . . . PHOTO STORAGE CONTROLLER, 13 . . . PHOTO RESTORER, 14 . . . PHOTO FORWARDER, 20 . . . USER TERMINAL (DISPLAY DEVICE), 101 . . . FIRST STORAGE, 102 . . . SECOND STORAGE, 201 . . . PHOTO OF A KEY, 202 . . . KEY IMAGE, 203 . . . DUMMY IMAGE, 204 . . . DUMMY PHOTO, 205 . . . METADATA, 207 . . . RELATIVE POSITION

The invention claimed is:

1. An electronic key photo album comprising:
a dummy photo generator that
cuts out, from a photo of a key taken together with a background of the key, a key image which is a partial image including the key and
complements, with a dummy image, an area from where the key image is cut out to generate a dummy photo;
a photo storage controller that
stores the dummy photo in a first storage together with metadata such as a shooting location and shooting date and time of the photo of the key and
stores the key image in a second storage in association with the dummy photo together with a relative position of the key image in the photo of the key;
a photo restorer that
reads out, from the first storage, a dummy photo,
reads out, from the second storage, a key image associated with the dummy photo thus read out and a relative position of the key image thus read out, and
pastes the key image thus read out to the relative position thus read out in the dummy photo thus read out to restore an original photo of a key in the key image thus read out; and
a photo forwarder that forwards the original photo of the key to a display device, wherein
the dummy photo generator receives the photo of the key from a mobile user terminal such as a smartphone or a tablet, the photo of the key being a one-shot image with its own metadata taken by the mobile user terminal and the background of the key being an object to which the key relates so that a user, when viewing the photo of the key later, can recognize what key it is, where it is used, and the like, and
the dummy photo generator cuts out, from the received photo of the key, the key image including the key, which is a motionless object.

2. The electronic key photo album according to claim 1, wherein
the photo restorer receives a search condition such as a shooting location and shooting date and time from the user, finds a dummy photo having the metadata that meets the search condition in the first storage, and reads out the dummy photo from the first storage.

3. The electronic key photo album according to claim 1, wherein
the dummy photo generator processes the key image to generate the dummy image.

4. The electronic key photo album according to claim 1, wherein
the key includes at least one of a mechanical key, a remote controller key, or a card key.

5. A non-transitory computer-readable recording medium on which a computer program is stored, wherein when the computer program is executed by a processor, the processor executes,
a first step of
cutting out, from a photo of a key taken together with a background of the key, a key image which is a partial image including the key and
complementing, with a dummy image, an area from where the key image is cut out to generate a dummy photo;
a second step of
storing the dummy photo in a first storage together with metadata such as a shooting location and shooting date and time of the photo of the key and
storing the key image in a second storage in association with the dummy photo together with a relative position of the key image in the photo of the key;
a third step of
reading out a dummy photo from the first storage,
reading out, from the second storage, a key image associated with the dummy photo thus read out and a relative position of the key image thus read out, and
pasting the key image thus read out to the relative position thus read out in the dummy photo thus read out to restore an original photo of a key in the key image thus read out; and
a fourth step of forwarding the original photo of the key to a display device, wherein
the first step includes
receiving the photo of the key from a mobile user terminal such as a smartphone or a tablet, the photo of the key being a one-shot image with its own metadata taken by the mobile user terminal and the background of the key being an object to which the key relates so that a user, when viewing the photo of the key later, can recognize what key it is, where it is used, and the like, and
cutting out, from the received photo of the key, the key image including the key, which is a motionless object.

6. The non-transitory computer-readable recording medium according to claim 5, wherein
the third step includes
receiving a search condition such as a shooting location and shooting date and time from the user,
finding a dummy photo having the metadata that meets the search condition in the first storage, and
reading out the dummy photo from the first storage.

7. The non-transitory computer-readable recording medium according to claim 5, wherein
when the computer program is executed by the processor, the processor further executes a step of processing the key image to generate the dummy image.

8. The non-transitory computer-readable recording medium according to claim 5, wherein
the key includes at least one of a mechanical key, a remote controller key, or a card key.

9. A method for creating an electronic key photo album, the method comprising:
a first step of cutting out, from a photo of a key taken together with a background of the key, a key image which is a partial image including the key;
a second step of complementing, with a dummy image, an area from where the key image is cut out to generate a dummy photo;
a third step of storing the dummy photo in a first storage together with metadata such as a shooting location and shooting date and time of the photo of the key;
a fourth step of storing the key image in a second storage in association with the dummy photo together with a relative position of the key image in the photo of the key;
a fifth step of reading out a dummy photo from the first storage;
a sixth step of reading out, from the second storage, a key image associated with the dummy photo thus read out and a relative position of the key image thus read out,
a seventh step of pasting the key image thus read out to the relative position thus read out in the dummy photo thus read out to restore an original photo of a key in the key image thus read out; and
an eighth step of forwarding the original photo of the key to a display device, wherein
the first step includes
receiving the photo of the key from a mobile user terminal such as a smartphone or a tablet, the photo of the key being a one-shot image with its own metadata taken by the mobile user terminal and the background of the key being an object to which the key relates so that a user, when viewing the photo of the key later, can recognize what key it is, where it is used, and the like, and
cutting out, from the received photo of the key, the key image including the key, which is a motionless object.

10. The method according to claim 9, wherein
the fifth step includes
receiving a search condition such as a shooting location and shooting date and time from the user,
finding a dummy photo having the metadata that meets the search condition in the first storage, and
reading out the dummy photo from the first storage.

11. The method according to claim 9, further comprising
a step of processing the key image to generate the dummy image.

12. The method according to claim 9, wherein
the key includes at least one of a mechanical key, a remote controller key, or a card key.

\* \* \* \* \*